(12) United States Patent
Woo

(10) Patent No.: US 10,592,105 B2
(45) Date of Patent: Mar. 17, 2020

(54) CHARACTER INPUT METHOD USING EXTENDED KEYPAD INCLUDING TARGET CHARACTER AND SUBSEQUENT CHARACTER, AND COMPUTING DEVICE PERFORMING SAME

(71) Applicant: Soon Jo Woo, Seongnam-si (KR)

(72) Inventor: Soon Jo Woo, Seongnam-si (KR)

( * ) Notice: Subject to any disclaimer, the term of this patent is extended or adjusted under 35 U.S.C. 154(b) by 0 days.

(21) Appl. No.: 16/082,612

(22) PCT Filed: Mar. 7, 2017

(86) PCT No.: PCT/KR2017/002428
§ 371 (c)(1),
(2) Date: Sep. 6, 2018

(87) PCT Pub. No.: WO2017/155268
PCT Pub. Date: Sep. 14, 2017

(65) Prior Publication Data
US 2019/0095096 A1   Mar. 28, 2019

(30) Foreign Application Priority Data

Mar. 7, 2016   (KR) .................. 10-2016-0027329
Mar. 7, 2017   (KR) .................. 10-2017-0028665

(51) Int. Cl.
*G06F 3/0488*   (2013.01)
*G06F 3/01*   (2006.01)
(Continued)

(52) U.S. Cl.
CPC .......... *G06F 3/04886* (2013.01); *G06F 3/018* (2013.01); *G06F 3/0236* (2013.01); *G06F 3/0482* (2013.01); *G06F 3/04847* (2013.01)

(58) Field of Classification Search
None
See application file for complete search history.

(56) References Cited

U.S. PATENT DOCUMENTS 8,847,894 B1 *   9/2014   Lee .................. G06F 1/1643
                                              178/18.01
2005/0052431 A1 *   3/2005   Chang .................. G06F 3/018
                                              345/173
(Continued)

FOREIGN PATENT DOCUMENTS

KR   10-2008-0070930 A   8/2008
KR   10-2008-0071523 A   8/2008
(Continued)

*Primary Examiner* — Duane N Taylor, Jr.
(74) *Attorney, Agent, or Firm* — Maschoff Brennan

(57) ABSTRACT

A character input method using an extended keypad including a target character and a subsequent character, and a computing device performing the same are provided. The character input method enables characters to be inputted by a computing device, which provides a keypad including a plurality of keys, at least one of which has allocated thereto a plurality of characters. According to the method, touch input on the keypad is detected and, when a certain key among the plurality of keys of the keypad is touched, an extended keypad corresponding to the touched key is displayed. The extended keypad includes a plurality of keys, each of which is allocated one different character or character string. Touch input on the extended keypad is detected and, when a certain key among the plurality of keys of the extended keypad is touched, a character or character string corresponding to the touched key is inputted.

10 Claims, 11 Drawing Sheets

FIGURE 3
WHEN SUBSEQUENT CHARACTER IS
CHARACTER STRING

(51) Int. Cl.
*G06F 3/023* (2006.01)
*G06F 3/0484* (2013.01)
*G06F 3/0482* (2013.01)

(56) References Cited

U.S. PATENT DOCUMENTS

| | | | | |
|---|---|---|---|---|
| 2007/0110222 | A1* | 5/2007 | Kim | G06F 3/0233 379/355.07 |
| 2011/0141027 | A1* | 6/2011 | Ghassabian | G06F 3/0237 345/168 |
| 2012/0326988 | A1 | 12/2012 | Woo | |
| 2013/0009880 | A1 | 1/2013 | Koh et al. | |
| 2013/0321315 | A1* | 12/2013 | Chang | G06F 3/041 345/173 |
| 2015/0040056 | A1* | 2/2015 | Cho | G06F 3/018 715/773 |
| 2017/0228123 | A1* | 8/2017 | Ghassabian | G06F 1/1626 |

FOREIGN PATENT DOCUMENTS

| | | |
|---|---|---|
| KR | 10-2010-0090850 A | 8/2010 |
| KR | 10-1046914 B1 | 7/2011 |
| KR | 10-1083786 B1 | 11/2011 |
| KR | 10-2013-0005451 A | 1/2013 |

* cited by examiner

FIG. 1

|   |     |     |      |   |
|---|-----|-----|------|---|
|   | abc | def |      |   |
|   | ghi | jkl | mno  |   |
|   | pqrs| tuv | wxyz |   |
|   |     | üûǔù| .?   |   |

FIGURE 1
3X4 PINYIN TYPING BOARD LAYOUT

FIG. 2

|   |     |     |      |   |
|---|-----|-----|------|---|
|   |     | a   | z    |   |
|   | b   | c   | ch   |→ RETROFLEX CONSONANT |
|   | pqrs| tuv | wxyz |   |
|   |     | üûǔù| .?   |   |

FIGURE 2
WHEN TARGET CHARACTER IS
CHARACTER STRING

FIG. 3

FIGURE 3
WHEN SUBSEQUENT CHARACTER IS
CHARACTER STRING

FIG. 4

FIGURE 4
GROUP OF PLURALITY
OF TARGET CHARACTERS

FIG. 5

| | á | ă | à | |
|---|---|---|---|---|
| ng | ā | a | 2 | |
| n | b | c | ch | |
| | pqrs | tuv | wxyz | |
| | | ūúǔù | .? | |

FIGURE 5
WHEN ā IS SELECTED
AS TARGET CHARACTER

FIG. 6

| | ng | ă | à | |
|---|---|---|---|---|
| | n | a | 2 | |
| | b | c | ch | |
| | pqrs | tuv | wxyz | |
| | | ūúǔù | .? | |

FIGURE 6
WHEN ă IS SELECTED
AS TARGET CHARACTER

FIG. 7
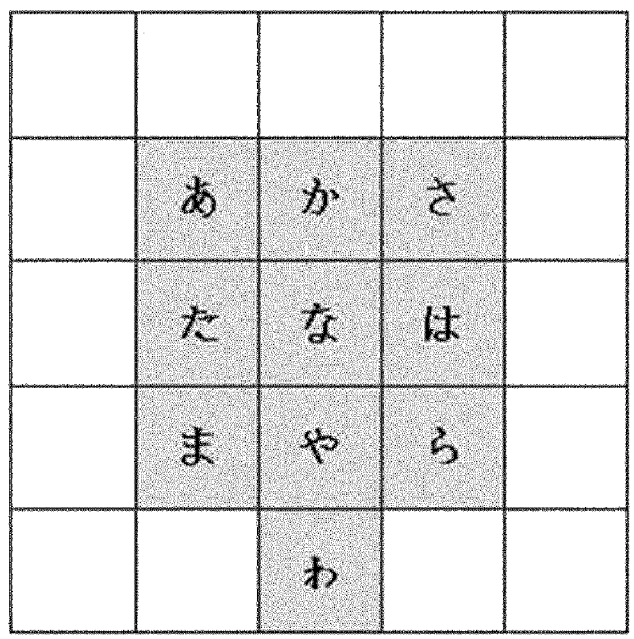
FIGURE 7
JAPANESE TYPING BOARD LAYOUT
FIG. 8
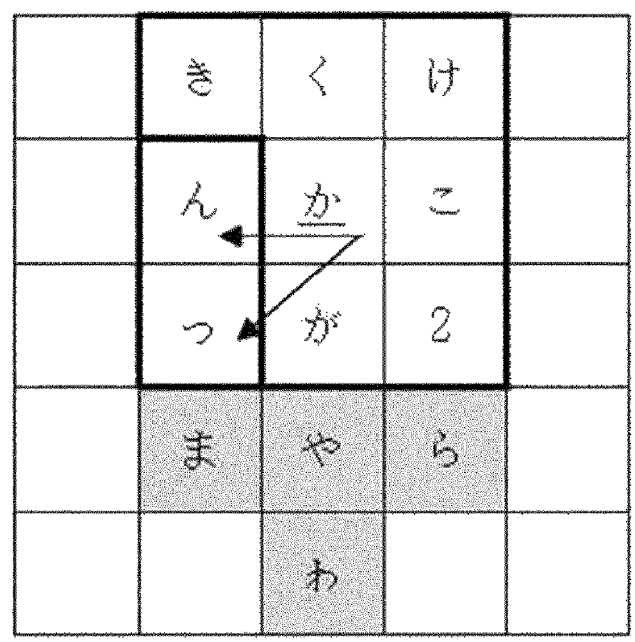
FIGURE 8
か-TOUCHED SCREEN

FIG. 9

FIGURE 9
き-ぎ-ん SELECTION PROCESS

FIG. 10

FIGURE 10
さ-SELECTED SCREEN

FIG. 11

FIGURE 11
きょう INPUT

FIG. 12

FIGURE 12
3x4 VIETNAMESE TYPING BOARD LAYOUT

TYPING BOARD LAYOUT
WHEN INPUTTING "abc"

TARGET OBJECT (BEDROOM) SELECTION
STEP 1

TARGET OBJECT (CURTAIN) SELECTION
STEP 2

SUBSEQUENT OPERATION 1

SUBSEQUENT OPERATION 2

CHARACTER INPUT METHOD USING EXTENDED KEYPAD INCLUDING TARGET CHARACTER AND SUBSEQUENT CHARACTER, AND COMPUTING DEVICE PERFORMING SAME

TECHNICAL FIELD

The present invention relates to a method of enhancing convenience and efficiency of a method of inputting a signal in computers, smartphones, tablet PCs, smartwatches, and all computing devices consisting of an input unit, an arithmetic unit, and an output unit, such as hologram three-dimensional stereoscopic image displays.

BACKGROUND ART

For input to mobile devices, a screen that can be provided in constituting input devices is restricted, and thus it is difficult to realize a keyboard on which many keys are arranged so as to generate various input signals or to display a great number of icons on the same screen. To display a large number of keys or icons on a screen, the size of each key or icon is required to be reduced, and in this case, visibility is reduced and there is an increasing possibility of malfunction in a process of selecting a small-sized key or icon.

In the case of character input, for example, mobile devices have a limitation such as the use of only one finger or two fingers due to characteristics thereof. To input a large number of characters using a small number of keys, it is required to use a method of assigning several characters to a single key and then identifying the assigned characters.

One example is a method of assigning several characters to a single key and then identifying the assigned multiple characters depending on how many times the corresponding key is touched. That is, there is a method of identifying multiple characters by selecting the first character by touching the corresponding key only once, selecting the second character by consecutively touching the corresponding key twice, and selecting the $n^{th}$ character by touching the corresponding key n times.

As another example, there is a method of assigning a plurality of characters to one key, and then rendering keys having the assigned characters activated around the input key when the corresponding key is touched, and selecting any one of the activated keys, or a method of searching for a desired character by repeatedly applying this method and inputting the character.

DISCLOSURE

Technical Problem

Although various input methods including the above-described methods have been proposed, most cases are methods of searching for desired characters and inputting the characters one by one. In these methods, when input of one key is completed, key input is released, and then a finger is moved to a key to which a character to be input is assigned and the character is input, and these processes should be repeated. Thus, these methods are disadvantageous in that the number of touches and a finger movement distance are increased.

Generally, to input characters or execute a specific function of a program in computing devices, it is necessary to input a signal by selecting one button in every input step. In this method, transmission and processing of the next signal is impossible until one signal is transmitted and processed.

An object of the present invention is to provide a method of easily and rapidly inputting a desired series of signals through one continuous input operation by solving these inconveniences.

However, technical problems to be solved by the present invention are not limited to the above-described technical problems, and other unmentioned technical problems will become apparent from the following description to those of ordinary skill in the art.

Technical Solution

In accordance with one aspect of the present invention, provided is a method of inputting a character to a computing device providing a keypad including a plurality of keys, wherein a plurality of characters are assigned to at least one of the plurality of keys, the method including: sensing a touch input to the keypad; displaying an extension keypad, as an extension keypad corresponding to the touched key, comprising a plurality of keys when a predetermined key of the plurality of keys of the keypad is touched, wherein a single character or character string is assigned to each of the plurality of keys, the characters or character strings being different from each other; sensing a touch input to the extension keypad; and inputting a character or character string corresponding to the touched key when a predetermined key of the plurality of keys of the extension keypad is touched, wherein the inputting of the character or character string includes: when a key to which a predetermined first target character of the extension keypad is assigned is touched, and then the touch is released, inputting the first target character; and when the key to which the first target character of the extension keypad is assigned is touched, a key to which a predetermined first subsequent character is assigned is touched, and then the touch is released, inputting a character string consisting of the first target character and the first subsequent character in this order.

In one embodiment of the present invention, the displaying of the extension keypad may include displaying an extension keypad including at least one key to which predetermined target characters are assigned and at least one key to which predetermined subsequent characters are assigned.

In one embodiment of the present invention, the displaying of the extension keypad may include displaying an extension keypad including a plurality of keys to which predetermined target characters are assigned, and the inputting of the character or character string may further include, when the key to which the first target character of the extension keypad is assigned is touched, converting the extension keypad such that the extension keypad includes the key to which the first subsequent character associated with the first target character is assigned.

In one embodiment of the present invention, the inputting of the character or character string may include: when the key to which the first target character of the extension keypad is assigned is touched, a key to which a predetermined second target character is assigned is touched, and then the touch is released, inputting only the second target character; and when a key to which the second target character of the extension keypad is assigned is touched, the key to which the first subsequent character is assigned is touched, and then the touch is released, inputting a character string consisting of the second target character and the first subsequent character in this order.

In one embodiment of the present invention, the inputting of the character or character string may further include, when the key to which the first subsequent character of the extension keypad is assigned is touched, converting the extension keypad such that the extension keypad includes a key to which a predetermined second subsequent character associated with the first subsequent character is assigned.

In addition, the inputting of the character or character string may include, when the key to which the first target character of the extension keypad is assigned is touched, the key to which the first subsequent character is assigned is touched, the key to which the second subsequent character is assigned is touched, and then the touch is released, inputting a character string consisting of the first target character, the first subsequent character, and the second subsequent character.

In one embodiment of the present invention, the inputting of the character or character string may include, when the key to which the predetermined first subsequent character of the extension keypad is assigned is touched, and then the touch is released, inputting a character string consisting of a predetermined third target character associated with the first subsequent character and the first subsequent character in this order.

In accordance with another aspect of the present invention, there is provided a computer readable recording medium recording a computer program for executing the above-described character input method.

In accordance with another aspect of the present invention, there is provided a computer program coupled to a computing device and stored in a medium executing the above-described character input method.

In accordance with another aspect of the present invention, there is provided a computing device providing a keypad including a plurality of keys, wherein a plurality of characters are assigned to at least one of the plurality of keys, the computing device executing the above-described character input method.

Other specific details of the present invention are included in the detailed description and the drawings.

Advantageous Effects

A plurality of characters are assigned to each of a plurality of keys in a typing board consisting of big keys sufficient not to cause an error when inputting characters in a mobile device and selectable target characters are displayed on a screen in every input step, thereby enabling selection of a target character, and one or multiple subsequent characters that can follow when the target character is selected are displayed on an output unit, thereby enabling selection of a subsequent character to be performed through one continuous operation, and accordingly, convenience and efficiency of input can be enhanced.

When this method is applied to a home automation control panel, a plurality of objects can be easily accessed and instructions of manipulating selected objects can be transmitted to a control device by one continuous operation.

Effects of the present invention are not limited to the aforementioned effects, and other unmentioned effects will become apparent from the following description to those of ordinary skill in the art.

DESCRIPTION OF DRAWINGS

FIG. 1 illustrates a Chinese 3×4 typing board.

FIG. 2 illustrates a case in which a target character is a character string.

FIG. 3 illustrates an example of a case in which a subsequent character is a character string.

FIG. 4 illustrates an example of a case in which a target character is a group.

FIG. 5 illustrates an example of a screen on which subsequent characters are activated when a target character is selected.

FIG. 6 illustrates an example of a screen on which subsequent characters are activated when another target character is selected.

FIG. 7 illustrates a Japanese 3×4 typing board layout.

FIG. 8 is an example of a screen activated when "か" is selected from among hiragana characters.

FIG. 9 illustrates an example of a process of selecting "ぎん" of "ぎんざ" in Japanese.

FIG. 10 illustrates an example of a process of inputting a Japanese character "ざ".

FIG. 11 is an example of a process of inputting Japanese characters "きょう".

FIG. 12 illustrates a Vietnamese 3×4 typing board layout.

MODE

Figure 13:
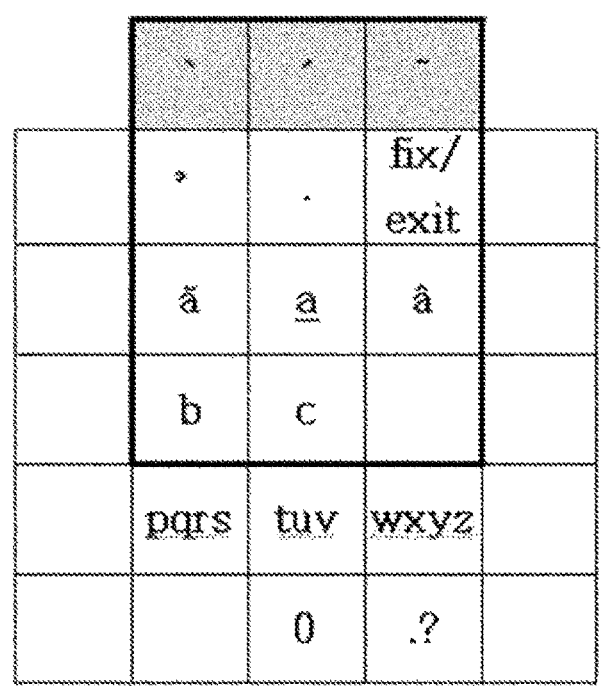
FIG. 13 illustrates an example of a screen on which a typing board with tone marks is activated.

Advantages, features, and methods of achieving the same of the present invention will become apparent from the following detailed embodiments with reference to the accompanying drawings. However, the present invention is not limited to the embodiments set forth herein, and may be embodied in many different forms. Rather, these embodiments are provided so that this disclosure will be thorough and complete, and will fully convey the scope of the invention to those of ordinary skill in the art, and the present invention should be defined by the scope of the appended claims.

The terms used in the present specification are merely used to describe embodiments, and are not intended to limit the present invention. As used herein, the singular forms are intended to include the plural forms as well unless specifically mentioned otherwise in the context. The terms "comprises" and/or "comprising" as used herein do not preclude the presence or addition of one or more other elements, in addition to the aforementioned elements. Like reference numerals denote like elements throughout the specification, and the term "and/or" includes any and all combinations of one or more of the associated list. Although the terms "first," "second," and the like are used herein to describe various components, these components should not be limited by these terms. These terms are only used to distinguish one component from another component. Thus, a first component, which will be described below, may also be denoted as a second component within the technical spirit of the present invention.

Unless otherwise defined, all terms (including technical and scientific terms) used herein have the same meaning as commonly understood by one of ordinary skill in the art to which this invention pertains. In addition, terms defined in commonly used dictionaries will not be interpreted in an idealized or overly formal sense unless clearly defined specifically otherwise.

Hereinafter, embodiments of the present invention will be described in detail with reference to the accompanying drawings. A computing device (not shown), which implements the present invention, includes an input unit, an arithmetic unit, and an output unit. The input unit receives a signal from a user. The arithmetic unit calculates the signal input by a user. The output unit outputs the calculated results. The input unit and the output unit may be integrally provided. For example, the input unit may be a touch sensor, and the output unit may be a display panel. In addition, a touchscreen panel in which the input unit and the output unit are integrally configured may be provided. However, the present invention is not limited to the above examples. As described below, a mouse may also be provided as an input unit.

In the present invention, a button or a key refers to an element constituting a physical or virtual input device intended to generate a specific signal.

A typing board refers to a board on which an arbitrary number of keys is arranged according to a certain rule, and includes a keyboard or a keypad. The typing board includes an arbitrary number of keys, and predetermined characters are assigned to each key. Some or all of the predetermined characters assigned to each key are displayed on each key.

The computing device provides a typing board for a user such that the user can input characters. The typing board includes a plurality of keys, and plural characters are assigned to each key due to screen limitation. The computing device senses an input to the typing board and inputs a character selected by a user according to sensing results. Alternatively, the computing device may interpret an input to the typing board as a specific command signal, thereby changing the typing board or displaying a new typing board.

The present invention may be implemented as follows when applied to a character input method. The character input method includes: selecting a specific key to activate characters assigned to the corresponding key; selecting any one of the activated characters as a target character; repeating this process if needed; activating subsequent characters by which the selected target character is followed when the target character is selected; continually selecting subsequent characters if needed; and selecting a subsequent character and inputting the subsequent character or a series of subsequent characters along with the target character.

At this time, selection of a target character may be performed by an initial keystroke, selecting any one from among characters activated by the initial keystroke, or selecting a new character activated by such selection. The expression "selecting any one" as used herein is intended to include an operation of dragging to activated characters with a finger used in the initial keystroke, an operation of touching any one of the characters activated with a new finger except for the finger used in the initial keystroke, an operation of touching another key with another finger in a state in which a finger presses a specific key on a qwerty keyboard used in a general computer, or the like. In this regard, the other finger may be a finger of the same hand or the other hand.

The input does not need to be performed only by a finger touch. A target character may be selected by moving a mouse cursor to a specific key on a virtual keyboard displayed on a monitor of a computer, and then clicking a left button of the mouse or dragging to another key while the left button of the mouse is pressed. After selecting the target character, a subsequent character may be selected by moving a cursor onto the activated subsequent characters. If needed, dragging a cursor may be repeated to select a target character or a subsequent character.

At this time, the target character may be a specific character or a specific character group. For example, in Chinese, a vowel has four tones. When selecting a key to which a, b, and c are assigned, vowels exhibiting four tones including the first to the fourth tones for the vowel "a", in addition to a, b, and c, may constitute a target character group. When any one is selected from thereamong and determined as a target character, subsequent characters by which the target character is followed may be activated and displayed around the selected target character, and when the corresponding subsequent character is selected, the target character and the subsequent character may be consecutively or simultaneously input and output on a screen.

The target character and the subsequent character may not necessarily be a single character, and may be a specific character string.

A case in which the target character is a character string will be described below as an example. A 3×4 Chinese Pinyin typing board is basically the same as an English alphabet typing board as illustrated in FIG. 1. Here, as indicated by an arrow in FIG. 2, a character string "ch" indicating a retroflex consonant may be added as a target character. When a key representing "abc" on the typing board of FIG. 1 is touched, an extension typing board of key arrangement, as illustrated in FIG. 2, may be activated. At this time, when a key representing "ch" is selected, the target character "ch" may be input. A retroflex consonant "sh" or "zh" may also be processed in the same manner as described above.

A case in which the subsequent character is a character string will be described below as an example. In many languages, syllables may have a first sound, a middle sound, and an end sound, and unlike this, Chinese syllables are described as being broadly divided into initials and finals. The reason for this is that in other languages, various sounds are observed in the end sounds, whereas in Chinese, only nasal sounds [n] and [ŋ] are end sounds. These sounds are represented by n and ng, respectively, in Chinese Pinyin. As such, since only two sounds are end sounds, a subsequent character may be predicted after a vowel corresponding to the middle sound is determined. In this case, after the vowel, which is a target character, nasal sounds as subsequent characters may be activated and selected, thereby significantly enhancing efficiency and convenience of character input.

FIG. 3 illustrates an example of a configuration such that subsequent characters are included along with the target character in key arrangement of an extension typing board activated by touching the key representing "abc" on the typing board of FIG. 1. An area indicated by a bold line is an area to which the subsequent characters are assigned. When dragging from a key representing "a" of FIG. 3 to a key representing "ng" is performed and then the touch is released, "a" may become a target character and "ng" may become a subsequent character so that a character string "ang" is input to an input window. When dragging from the key representing "a" to a key representing "n" is performed and then the touch is released, "a" becomes a target character, "n" becomes a subsequent character, and consequently, a character string "an" is input to an input window. In addition, when the touch is released on the key representing "a" without dragging, only the target character "a" is input.

In summary, a touch input to a basic typing board is sensed, and when a predetermined key on the basic typing board is touched, an extension typing board corresponding to the touched key is activated and displayed. Subsequently, a touch input to the extension typing board is sensed, and when a predetermined key on the extension typing board is touched, a character or character string corresponding to the touched key is input.

At this time, when a key representing a predetermined target character of the extension typing board is touched and then the touch is released, the target character of the touched key is input. In addition, when dragging from the key representing a predetermined target character of the extension typing board to a key representing a predetermined subsequent character is performed and then the touch is released, a character string consisting of the selected target character and the selected subsequent character is input.

When target characters are consecutively selected, i.e., dragging from the key representing a predetermined target character of the extension typing board to a key representing another predetermined target character is performed and the touch is released, only the finally selected target character is input.

In addition, as illustrated in FIG. 3, when target characters are consecutively selected, and then subsequent characters are selected, i.e., dragging from the key representing a predetermined target character of the extension typing board to the key representing another predetermined target character is performed, and dragging to a key representing a predetermined subsequent character is performed again, and then the touch is released, a character string consisting of the finally selected target character and the selected subsequent character is input.

Alternatively, when the key representing a predetermined subsequent character of the extension typing board is directly touched, and then the touch is released, a predetermined target character associated with the subsequent character of the touched key is input along with the selected subsequent character. The input order is the order of the target character and the subsequent character as described above. A specific character of the extension typing board is regarded as a target character to be input before the selected subsequent character.

In a method of inputting one character at a time, at least five touches are required to input "chang". However, according to the present invention in which target characters and subsequent characters are defined and input, "chang" may be input with only two touches.

The extension typing board may be configured to include subsequent characters along with the target character. Alternatively, when a predetermined key of the typing board is touched, an extension typing board including the target character is provided. Subsequently, when a key representing the predetermined target character of the extension typing board is touched, the extension typing board may be converted such that predetermined subsequent characters associated with the target character of the touched key are additionally activated and displayed. In the example of FIG. 3, an area indicated by a bold line to which subsequent characters are assigned is additionally formed when the key representing "a" is touched.

The present invention may be implemented in such a manner that a group of a plurality of target characters is defined, when applied to character input.

FIG. 4 illustrates a case in which a target character group is designated. When a key representing "abc" is touched, characters "a" with tones are displayed on the left, upper left, upper, and upper right sides of "a". These characters belong to the target character group of "a". Thus, in a case in which target characters are activated by touching the key representing "abc", even though any one is selected from thereamong, "n" or "ng", which is the subsequent character, may be activated. A target character group may be designated for a predetermined key or each character.

FIG. 5 illustrates a screen showing a case in which the target character group is defined. In a case in which an extension typing board including the target character group is activated by touching the key representing "abc", when dragging to a target character is performed, "n" and "ng", which are subsequent characters associated with the target character, are additionally activated and displayed on a screen. At this time, when dragging to any one of the two subsequent characters is performed, a character string consisting of a series of the target character and the subsequent character may be input to an input window.

FIG. 6 illustrates a case in which, when a character "a" with the third tone is selected as a target character, subsequent characters are activated.

This method may also be applied to input of Japanese contracted sounds, geminate consonants, and pronunciations. Japanese, like Chinese, is also an open-syllable language that does not have end sounds. Exceptionally, there are a pronunciation "ん" and a geminate consonant "っ", which are Japanese characters corresponding to end sounds of other languages. These characters may be designated as subsequent characters, thereby enhancing input efficiency.

FIG. 7 is a diagram showing Japanese hiragana on a 3×4 typing board. In FIG. 8, an area indicated by a bold line shows an example of key arrangement of an extension typing board activated when a key representing "か" in key arrangement of the typing board of FIG. 7 is touched. After the key representing "か", which is a target character, is touched, dragging to a key representing "ん" or "っ", which is a subsequent character, is performed, and then the touch is released, thereby simultaneously inputting the target character and the subsequent character in the touched order. That is, a character string consisting of "かん" or "かっ" may be input at once. When this method is used, "かん" of "かんさい(西)" or "かっ" of "わかった" may be input with one touch.

As illustrated in FIG. 9, in a case in which "き" is a target character, a key representing "か" may be touched, and then dragging to a key representing "き" may be performed to select the target character "き". At this time, the extension typing board may be converted such that a voiced sound "ぎ" for "き" is activated and displayed on the original key representing "か", and "や", "ゆ", and "よ" are respectively activated and displayed on the upper, upper right diagonal, and right sides of the key representing "ぎ".

In the extension typing board activated by touching the key representing "か", dragging to the key representing "き" to the key representing "か" (the key representing "ぎ") may be performed, thereby selecting the voiced sound "ぎ" for "き" as a target character. Subsequently, dragging to a key representing "ん" or "つ" on the left side of the key representing "ぎ" may be performed, thereby selecting a subsequent character. According to this method, it is possible to input "ぎん" of "ぎんざ(銀座)" with one touch. In addition, as illustrated in FIG. 10, a target character "ざ" may also be input with one touch by dragging to a key representing "ざ" in an extension typing board activated by touching a key representing "さ".

In summary, when a key representing a predetermined target character of the extension typing board is touched, the extension typing board may be converted such that another predetermined target character associated with the target character of the touched key is activated and displayed. At this time, the additionally activated and displayed target character may be displayed on the existing key representing another target character.

Subsequent characters or a subsequent character group may be configured to be activated only once, but subsequent characters may also be repeatedly activated. The selection of a subsequent character may be performed by renewing the extension typing board such that other subsequent characters are additionally activated every time a key representing the subsequent character is selected. The selection of a subsequent character may also be performed such that, in a state in which a subsequent character group consisting of a plurality of characters or symbols is activated, dragging to each subsequent character is repeated and the corresponding subsequent character is input.

An example of repeatedly activating subsequent characters will be described with reference to FIG. 11. When a predetermined extension typing board is activated by touching the key representing "か" and a target character "き" is selected by dragging to a key representing the target character "き", subsequent characters of "き" are additionally activated, and when "よ", which is a subsequent character of "き", is selected by dragging to a key representing "よ" among the subsequent characters, "う", which is a subsequent character of "よ", may be additionally displayed on a position adjacent to "よ". According to this method, "きょう", which is a word meaning today, may be input with one touch, or a Chinese character "今日", which corresponds to this word, may be searched for with one touch.

In summary, when a key representing a predetermined subsequent character of the extension typing board is touched, the extension typing board may be converted such that another predetermined subsequent character associated with the subsequent character of the touched key is additionally activated and displayed.

Thus, as illustrated in FIG. 12, when dragging from a key representing a predetermined target character of an extension typing board to a key representing a predetermined subsequent character to a key representing another predetermined subsequent character is performed, and then the touch is released, a character string consisting of the selected target character and various subsequent characters is input.

The method of activating and fixing a subsequent character group may be applied to input of Vietnamese tone marks.

FIG. 12 illustrates key arrangement of a Vietnamese typing board. FIG. 13 illustrates an example of key arrangement of an extension typing board that may be activated when a key representing "abc" on the typing board of FIG. 12 is touched. When dragging from the key representing "abc" to a character with a tone on the left or right side of "a", or a specific activated key on the right side of "a" is performed, key arrangement on which tones are displayed may be fixed. For example, when dragging from the key representing "abc" to a key representing "fix/exit" is performed, key arrangement displaying tone marks may be fixed and "a" may be processed as a target character. At this time, as illustrated in FIGS. 5 to 11, the activated key arrangement may be displayed on keys of the initial typing board, and as illustrated in FIG. 13, additional keys may be temporarily activated and displayed in an area outside the initial typing board.

In addition, the typing board layout may be initialized by touching a key representing a tone mark to be input and then pushing the "fix/exit" button. The key representing a tone mark may be touched as many times as the number of symbols to be input. The "fix/exit" key may be implemented to be displayed in a toggle manner.

The key arrangement to which tone marks are assigned may be differently defined according to a key representing a vowel.

This method may be equally applied to a virtual keyboard displayed on a web document. In addition, tone marks may be displayed on a virtual keyboard output on a monitor of a computer to guide input.

When viewing the display of a virtual keyboard of a computer monitor and inputting a tone mark, key arrangement in which tone marks are displayed may be fixed by pressing a specific key with a finger of the other hand in a state in which a vowel is pressed. At this time, the specific key may be a shift key, a control key, or other keys.

The present invention may also be implemented such that, when a specific target character is selected, a subsequent character is automatically input.

In Hindi, a consonant group allows only certain consonant sequences. For example, the consonant "d" may be followed by "v", "y", "d", "h", "b", "m", and the like, and when "d" is followed by "b", "b" always should be followed by "h" since "b" is an aspirated sound. For this reason, when is "b" input after inputting "d", "h" may be automatically input.

The target character or subsequent character may not necessarily be a character of a specific language, and may be a special symbol or a punctuation mark. In the case of a large number of target characters, the target characters may be classified according to type, and typing board layout in which each type of target characters is activated may be fixed for use. Each type of target characters may be activated when a specific key or key combination is touched and maintained in a state of being displayed on an output unit. At this time, when any one symbol or sign belonging to the target character type is touched, symbols, signs, or characters by which the symbol or the sign is followed are activated, and when any one thereof is selected as a subsequent character, the target character and the subsequent character may be input according to the selected order.

In one embodiment, in a case in which symbols representing a distance form a target character type, when km, which is one of the distance units, is selected, a slash symbol is activated and displayed on any one of neighboring keys, and when the slash symbol is selected as a subsequent character by touching the activated slash symbol or dragging to a position of the slash symbol, keys representing h, m, sec, and the like, which are time units, are activated on keys in the vicinity of the slash symbol and displayed on an output unit, and when any one thereof is selected by dragging or touching, a series of the target character and the subsequent character may be input in the selected order.

The present invention may be applied to a variety of fields as well as character input. In one embodiment, a control panel for home automation may be implemented in a smartphone as described below. When an icon representing the control panel is touched, control panel applications are activated, and along with button(s) for controlling the control panel applications, an icon representing a lighting apparatus group, an icon representing a curtain group, an icon representing a door group, an icon representing an air conditioner group, and icons representing a variety of home appliances groups may be displayed.

In one embodiment, when the icon representing a lighting apparatus group is touched, icons for various lighting apparatuses installed in a building are activated and displayed, and when any one thereof is selected as a target object, a control interface such as a slide bar capable of adjusting the degree of brightness, including an on/off button or an on/off function is displayed as a subsequent operation for the selected object, and an operation of selecting an on/off button or controlling the position of a cursor of the slide bar by dragging may be input as a subsequent operation. With regard to opening/closing of a front gate, a front door, or a door installed in buildings, it is possible to implement manipulation in the same manner. When the icon representing a door group is selected by touching or dragging, door icons capable of opening or closing a door are activated and displayed on a screen, and when any one thereof is selected, a control interface such as an icon for selecting an open/close state of a door may be activated and displayed on an output unit.

Grouping target objects according to type is to enable the same operation to be performed on all the target objects. In one embodiment, according to this method, an off instruction may be given to all illumination objects. Similarly, it is possible to group target objects according to position. Grouping according to type and grouping according to position may be simultaneously implemented and selectively used.

The step of selecting a target object and the step of selecting a subsequent operation for the selected target object may be consecutively performed by touching or dragging, and a state of each selected process may be fixed and displayed on an output unit although the input is released.

If needed, target objects may be grouped according to type as described above, or may also be grouped according to position. For example, it is possible to divide spaces of a building into a kitchen, a living room, bedroom 1, bedroom 2, a front door, and the like, and perform grouping according to each space. In this case, when a control panel application is activated by touching, icons for each space are activated and displayed on a screen, and when any one of the icons is selected by touching or dragging, an icon for a target object present in the corresponding space may be activated and displayed. When the activated icon for a target object is selected, as described above, a button or slide bar or other control interfaces capable of selecting a subsequent operation may be activated and displayed.

In one embodiment, when an icon of a home automation application having the above-described functions is touched, a control panel consisting of objects as illustrated in FIG. is activated and displayed on an output unit. Alternatively, the present embodiment may also be implemented such that, when an icon of a home automation control panel application is touched, target objects are activated and displayed around the application icon.

Figure 15:
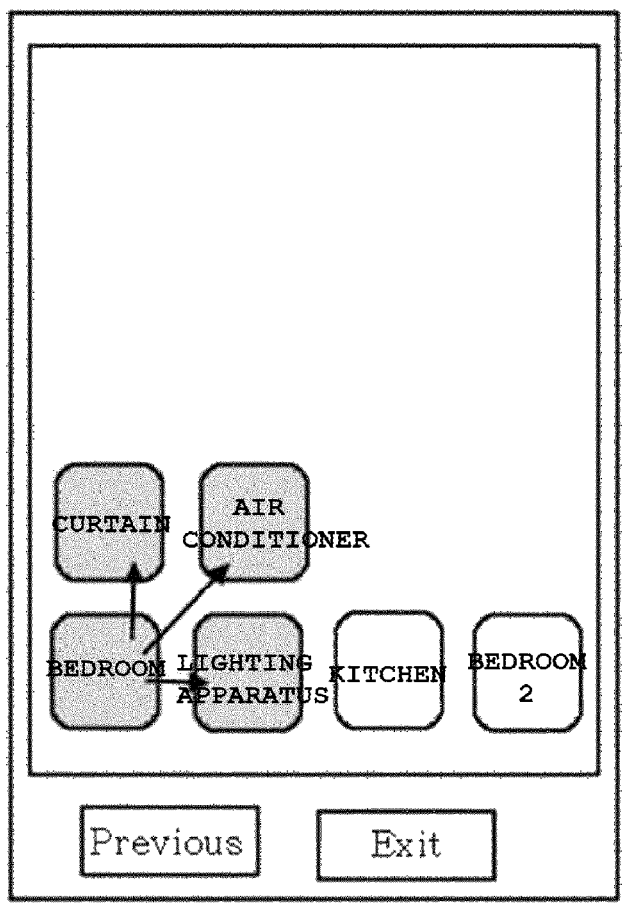
FIG. 15 illustrates an example of a screen on which selectable objects present in a "bedroom" are activated.

FIG. 15 illustrates a state in which, when a bedroom object is selected, curtain, air conditioner and illumination buttons are activated again. A user may select any one of the curtain, the air conditioner, and the illumination buttons by dragging.

Figure 16:
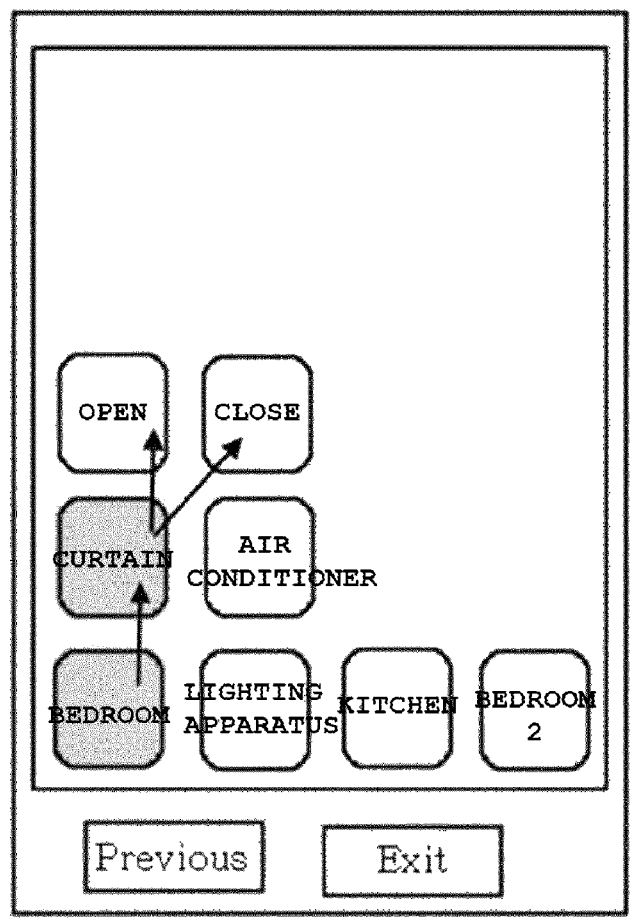
FIG. 16 illustrates an example of a screen on which a subsequent manipulation process is activated when the object "curtain" is selected.

FIG. 16 illustrates a screen on which, when "curtain" is selected as a target object, an "open" button and a "close" button are activated as a subsequent operation. When the "open" button is selected, a bedroom curtain may be opened, and when the "close" button is selected, the bedroom curtain may be closed.

Figure 17:
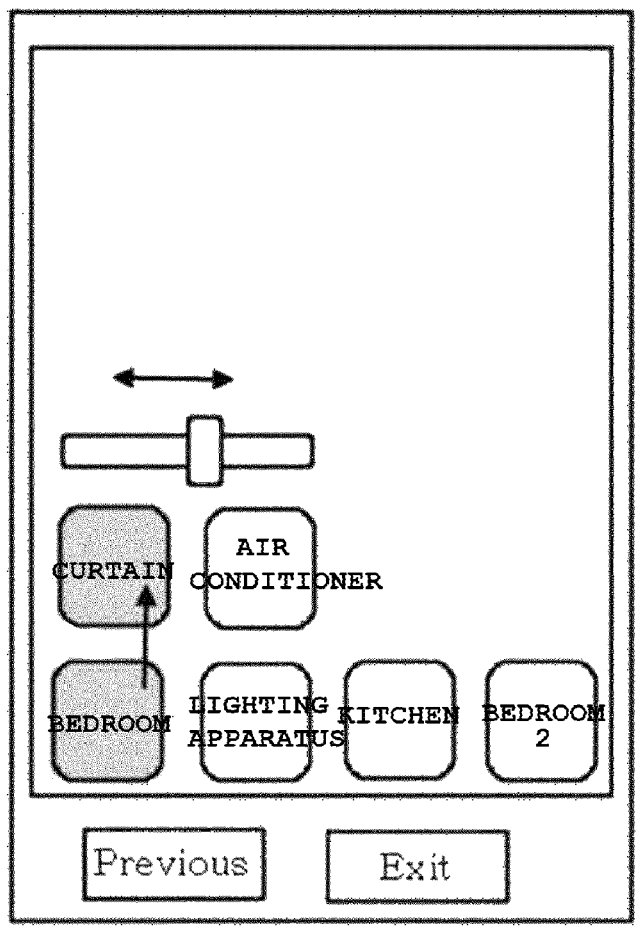
FIG. 17 illustrates another example of a screen on which a subsequent manipulation process is activated when the object "curtain" is selected.

As illustrated in FIG. 17, a slide bar may be activated instead of the "open" or "close" button and the degree of opening or closing may be adjusted according to dragging direction and distance. For an air conditioner or a lighting apparatus, a method of selecting an object and determining a subsequent operation may be implemented in a similar manner. The intensity of the air conditioner may be adjusted or the air conditioner may be turned on or off, and the brightness of the lighting apparatus may be adjusted or the lighting apparatus may be turned on or off. If needed, a target object such as a television may be added, and a target object such as heating may also be added.

Figure 14:
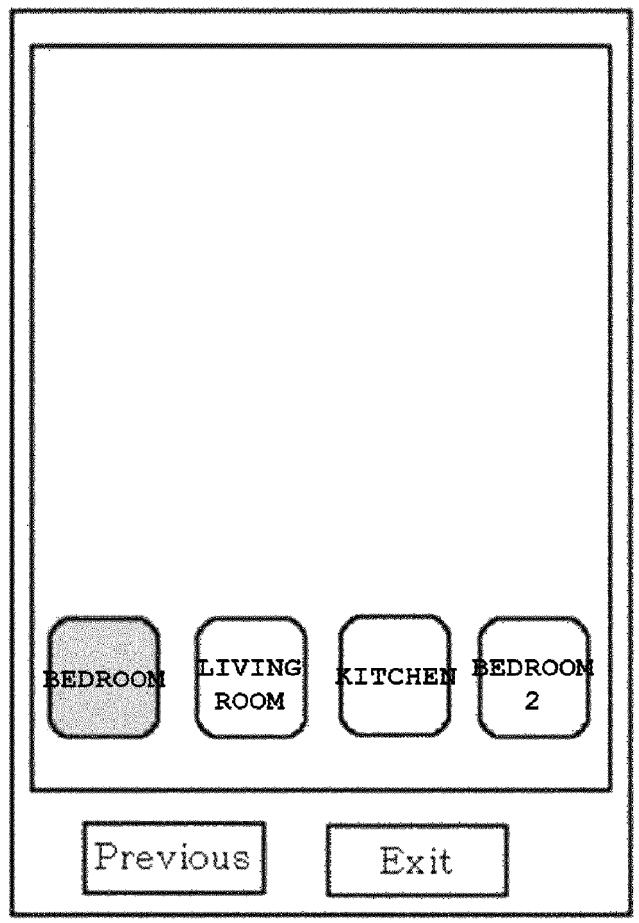
FIG. 14 illustrates an example showing a process of selecting a bedroom, which is one of the highest-level objects in a home automation control panel.

A function allowing the step of selecting a target object to return to the previous step may be provided to a "previous" button illustrated in FIGS. 14 to 17. In a case in which the step of selecting a target object is implemented to be maintained on a screen, a button for a target selection step may be selected instead of the "previous" button so as to be converted to the step of selecting a target object. For example, as illustrated in FIG. 16 or 17, in a case in which "curtain" in "bedroom" is selected as a target object, when the "curtain" button is selected, as illustrated in FIG. 14 or 15, it may be implemented to return to a step of selecting a target object in the bedroom.

In addition, operation may be implemented using a combination of this method and the "previous" button. For example, FIG. 15 illustrates a step of selecting "bedroom" as a target object. At this time, since an object in the "bedroom" called "lighting" covers the target object "living room" equivalent to "bedroom," the "previous" button may be pressed and as illustrated in FIG. 14, this step may return to a step of selecting the highest-level target object.

According to the above-described method, access to and selection of a target object may be performed through a single continuous operation not only in character input, but also in operating a control panel for home automation, thereby enhancing convenience and efficiency. Steps of the method or algorithm described in connection with the embodiments of the present invention may be implemented directly as hardware, a software module executed by the hardware (a computer program, an application, and the like), or a combination thereof. The software module may be provided in a random access memory (RAM), a read only memory (ROM), an erasable programmable ROM (EPROM), an electrically erasable programmable ROM (EEPROM), a flash memory, a hard disk, a removable disk, a CD-ROM, or any form of computer readable recording medium well known in the art to which the present invention pertains.

While embodiments of the present invention have been described with reference to the accompanying drawings, it will be understood by those of ordinary skill in the art to which the present invention pertains that the present invention may be embodied in different forms without changing the technical spirit or essential characteristics of the present invention. Thus, the embodiments described herein should be construed as being provided for illustrative purposes only and not for purposes of limitation.

The invention claimed is:

1. A method of inputting a character to a computing device providing a keypad comprising a plurality of keys, wherein a plurality of characters are assigned to at least one of the plurality of keys, the method comprising:
   sensing a touch input to the keypad;
   displaying an extension keypad, as an extension keypad corresponding to the touched key, comprising a plurality of keys when a predetermined key of the plurality of keys of the keypad is touched, wherein a character string is assigned to each of the plurality of keys, the characters or character strings being different from each other;
   sensing a touch input to the extension keypad; and
   inputting a character or character string corresponding to the touched key when a predetermined key of the plurality of keys of the extension keypad is touched,
   wherein the inputting of the character or character string comprises:
      when a key to which a predetermined first target character of the extension keypad is assigned is touched, and then the touch is released, inputting the first target character; and
      when the key to which the first target character of the extension keypad is assigned is touched, a key to which a predetermined first subsequent character is assigned is touched, and then the touch is released, inputting a character string consisting of the first target character and the first subsequent character in this order.

2. The method of claim 1, wherein the displaying of the extension keypad comprises displaying an extension keypad comprising at least one key to which predetermined target characters are assigned and at least one key to which predetermined subsequent characters are assigned.

3. The method of claim 1, wherein:
   the displaying of the extension keypad comprises displaying an extension keypad comprising a plurality of keys to which predetermined target characters are assigned, and
   the inputting of the character or character string further comprises, when the key to which the first target character of the extension keypad is assigned is touched, converting the extension keypad such that the extension keypad comprises the key to which the first subsequent character associated with the first target character is assigned.

4. The method of claim 1, wherein the inputting of the character or character string comprises:
   when the key to which the first target character of the extension keypad is assigned is touched, a key to which a predetermined second target character is assigned is touched, and then the touch is released, inputting only the second target character; and
   when a key to which the second target character of the extension keypad is assigned is touched, the key to which the first subsequent character is assigned is touched, and then the touch is released, inputting a character string consisting of the second target character and the first subsequent character in this order.

5. The method of claim 1, wherein the inputting of the character or character string further comprises, when the key to which the first subsequent character of the extension keypad is assigned is touched, converting the extension keypad such that the extension keypad comprises a key to which a predetermined second subsequent character associated with the first subsequent character is assigned.

6. The method of claim 5, wherein the inputting of the character or character string comprises:
   when the key to which the first target character of the extension keypad is assigned is touched, the key to which the first subsequent character is assigned is touched, the key to which the second subsequent character is assigned is touched, and then the touch is released, inputting a character string consisting of the first target character, the first subsequent character, and the second subsequent character.

7. The method of claim 1, wherein the inputting of the character or character string comprises:
   when the key to which the predetermined first subsequent character of the extension keypad is assigned is touched, and then the touch is released, inputting a character string consisting of a predetermined third target character associated with the first subsequent character and the first subsequent character in this order.

8. A computer readable recording medium recording a computer program for executing the method of claim 1.

9. A computer program coupled to a computing device and stored in a medium executing the method of claim 1.

10. A computing device providing a keypad comprising a plurality of keys, wherein a plurality of characters are assigned to at least one of the plurality of keys, the computing device executing the method of claim 1.

* * * * *